Nov. 25, 1924. 1,516,724
P. HAASE
MACHINE FOR CUTTING TURNIPS, BEETS, POTATOES AND LIKE TUBEROUS
VEGETABLES, BACON AND SIMILAR SUBSTANCES INTO SLICES, CHIPS, OR CUBES
Filed Nov. 19, 1923

Witnesses  Inventor
Paul Haase.

Patented Nov. 25, 1924.

1,516,724

UNITED STATES PATENT OFFICE.

PAUL HAASE, OF BERGEDORF, GERMANY.

MACHINE FOR CUTTING TURNIPS, BEETS, POTATOES, AND LIKE TUBEROUS VEGETABLES, BACON AND SIMILAR SUBSTANCES INTO SLICES, CHIPS, OR CUBES.

Application filed November 19, 1923. Serial No. 675,754.

*To all whom it may concern:*

Be it known that I, PAUL HAASE, a citizen of the German Republic, and resident of No. 21 Neue Strasse, Bergedorf, in the Republic of Germany, have invented a new and useful Improved Machine for Cutting Turnips, Beets, Potatoes, and like Tuberous Vegetables, Bacon, and Similar Substances into Slices, Chips, or Cubes, of which the following is a specification.

The present invention relates to an improved machine for cutting turnips, beets, potatoes and like tuberous vegetables, bacon and similar substances into slices, chips or cubes.

Special objects of the invention are to render more efficient, serviceable and durable in operation machines of the kind referred to.

With these ends in view the invention consists in the novel combination, arrangement and adaptation of parts, all as more fully hereinafter described, shown in the accompanying drawing and then specifically set out in the appended claims.

In the drawing is shown by way of example one mode of carrying into practice this invention:

Figure 3:
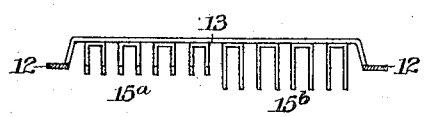
Figure 4:
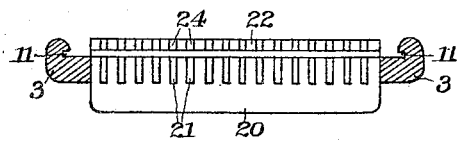

Figs. 3 and 4 illustrate constructional details. On a base 1 to be secured to a table or other suitable support 2 is firmly mounted an upright frame 3, which carries the cutting mechanism and the means for actuating same.

A bracket 4 laterally secured to or made integral with the frame 3 at the top end thereof serves for pivotally connecting thereto by means of the screw bolt 5 an oscillating lever 6, to which is pivotally connected by means of the pin 7 a hand lever 8. The hand lever 8, which extends transversely across the frame 3 projecting with the handle 9 at the other side thereof, is pivotally connected by means of the screw bolt 10 to a reciprocating cutting mechanism movable up and down in guide ways 11 provided by the frame 3.

The cutting mechanism, which engages by means of the lateral flanges 12 the guide ways 11 in the frame 3, comprises three different blades 13, 14 and 15.

Figures 1, 2:
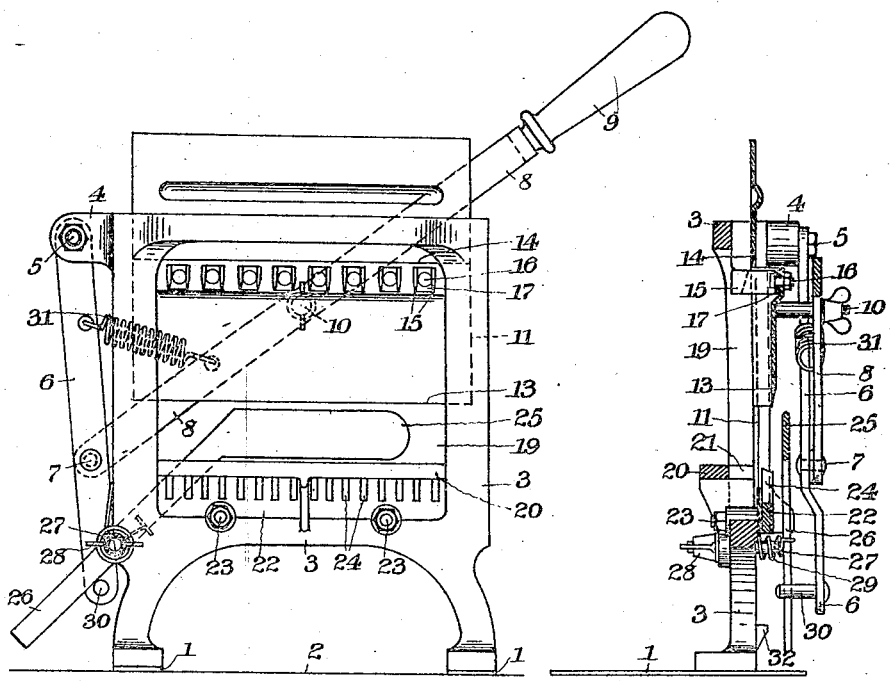
Fig. 1 is a rear elevation of the improved cutting machine.
Fig. 2 is a vertical sectional view thereof.

The blade 13 has its cutting edge at the lower end of the reciprocating cutting mechanism, the blade 14 has its cutting edge at a distance above and behind the blade 13 and the series of blades 15 have their cutting edges extending rearwardly from the top end of the blade 13 towards the blade 14 terminating below the cutting edge of the latter, as shown in Fig. 2.

The blades 15 are arranged at equal distances apart and are rigidly secured by means of screw bolts 16 to the blade 13 at the top end thereof. As shown in Figs. 1 and 2 one screw bolt 16 suffices for securing two blades 15, the latter being in pairs connected by a transverse web 17, which is firmly pressed against the blade 13 by the screw bolt 16.

After removing the screw bolts 16 the blades 15 can be taken off to be resharpened at their cutting edges when necessary. To resharpen the cutting edges of the blades 13 and 14 the screw bolt 10 has to be removed to disconnect the hand lever 8 from the cutting mechanism, so that the latter may be removed from the guide ways 11 of the frame 3. It is obvious that previous to the resharpening of the cutting edge of the blade 14 the blades 15 have to be removed in the manner described.

The reciprocating cutting mechanism operates in a preferably square shaped opening 19 of the frame 3 provided for the passage of the substances to be cut. At the rear of this opening 19 the frame 3 carries a table or trough 20 serving as a support for the substances to be cut. This table or trough 20 extends into the opening 19 close to the reciprocating blade 14, but not interfering with the downward movement of the latter. The front end of the table or trough 20 is provided with a series of vertical slots 21 corresponding to the arrangement of the blades 15, so that the cutting edges of the latter are enabled to enter the slots 21 in the downward movement of the cutting mechanism.

In front of the table or trough 20 at a short distance therefrom a plate 22 is secured to the frame 3 by means of screw bolts 23. The plate 22 is provided with vertical slots 24 in accordance with and in alignment to the slots 21 of the table or trough 20. The combed top surface of the plate 22 forms in front of the table or trough 20 a support for the substances to be cut, allowing the blades 13 and 14 to pass in front and at the rear thereof respectively and permitting the blades 15 to enter the slots 24 in the downward movement of the reciprocating cutting mechanism.

A gauge 25 to determine the thickness of the slices cut by the blade 13 is arranged between the reciprocating cutting mechanism and the oscillating lever 6, as shown in Fig. 2. This gauge 25 is carried by an arm 26 pivotally connected by means of a bolt 27 to the frame 3. The bolt 27 is journaled in a hole of the frame 3 projecting from the rear of the latter. The rear end of the bolt 27 is screw threaded and receives a winged nut 28, by means of which the bolt 27 may be axially displaced, so that the distance between the gauge 25 and the reciprocating cutting mechanism can be adjusted in accordance with the required thickness of the slices to be cut by the blade 13. A spiral spring 29 lifts the gauge 25 to its working position in front of the combed plate 22 and the table or trough 20. By coiling the spiral spring 29 around the bolt 27 it simultaneously serves for pushing the gauge 25 away from the reciprocating cutting mechanism as far as the winged nut 28 permits.

The gauge 25 cooperates with the oscillating lever 6 when the hand lever 8 is moved up and down to reciprocate the cutting mechanism. In pressing the hand lever 8 downwardly, the oscillating lever 6 swings aside and causes the gauge 25 to disappear below the combed plate 22 and below the table or trough 20, thereby disengaging from the substance to be cut. To this purpose the arm 26 of the gauge 25 extends below its pivot 27 and is engaged at its under surface by a stud 30 on the lower end of the oscillating lever 6. When in turning down the hand lever 8 the oscillating lever 6 swings aside, the stud 30 acting on the arm 26 causes the latter to turn around its pivot 27, thereby shifting the gauge 25 below the plate 22 and table 20. The tension of the coiled spring 29 returns the arm 26 and with it the gauge 25 to its original position when the hand lever 8 is turned upwardly. A coiled spring 31 interposed between the hand lever 8 and the oscillating lever 6 forces the cutting mechanism to return to its topmost position when the pressure on the hand lever 8 ceases.

The improved cutting machine is employed in the following manner:—

Supposing turnips and like tuberous vegetables or other substances requiring to be cut into slices, the lower blade 13 is put to action after the substance to be cut has been pushed from the rear against the properly adjusted gauge 25.

Should it be required to divide the substances to be cut into chips, the upper blade 14 and the chipping blades 15 are employed.

Should it be required to divide the substances to be cut into cubes, previous to the action of the blade 14 two successive cuts at right angles to one another are necessary by means of the chipping blades 15.

To accelerate the production of cubes, two sets of chipping blades 15 are provided, one set 15$^a$ extending the distance separating the blades 13 and 14 or a little farther, the other set 15$^b$ extending double that distance. The substance to be cut into cubes is put on the table 20 below the longer shipping blades 15$^a$ and after having been cut thereby it is turned by 90 degrees being simultaneously conveyed below the shorter chipping blades 15$^a$. By the action of the shorter chipping blades 15$^a$ the chips cut by the longer shipping blades 15$^b$ are subdivided into cubes. The subsequent action of the blade 14 severs from the substance a slice which falls to pieces of cubical shape.

By giving the substances to be cut a turn of 90 degrees after each cut cubes are continually produced by means of the blades 15 and 14.

Stops 32 on the frame 3 limit the downward movement of the reciprocating cutting mechanism.

I wish it to be distinctly understood, that I do not limit myself to the precise construction shown, seeing that various modifications may be carried out in the adaptation of my improved cutting machine to the several kinds of application and I therefore reserve the right to all such modifications that properly fall within the scope of the following claims.

What I do claim as my invention and desire to secure by Letters Patent is:—

1. Improved machine for cutting turnips, beets, potatoes and like tuberous vegetables, bacon and similar substances into slices, chips or cubes, comprising in combination an upright frame mounted on a base affording a firm support, a reciprocating cutting mechanism movable up and down in an opening of the upright frame, said cutting mechanism comprising a lower front blade, an upper rear blade and a series of blades bridging the space between the lower front blade and the upper rear blade below the latter, the lower front blade and the upper rear blade serving for slicing, the series of blades for chipping the slices cut by the upper rear blade, a hand lever in pivotal connection with the cutting mechanism for moving same up and down, an oscillating lever in pivotal connection with a bracket of the upright frame serving for providing a fulcrum for the hand lever, a support for the substances to be cut, and an adjustable gage determining the thickness of the slices to be cut, substantially as described and shown.

2. Improved machine for cutting turnips, beets, potatoes and like tuberous vegetables, bacon and similar substances into slices, chips or cubes, comprising in combination an upright frame mounted on a base affording a firm support, a reciprocating cutting mechanism movable up and down in an opening of the upright frame, a hand lever in pivotal connection with the cutting mechanism for moving same up and down, an oscillating lever in pivotal connection with a bracket of the upright frame serving for providing a fulcrum for the hand lever, a support for the substances to be cut, and an adjustable gage determining the thickness of the slices to be cut, said gage cooperating with the oscillating lever so as to disappear below the support for the substances to be cut on the downward movement of the cutting mechanism, an arm carrying the gage in pivotal connection with a bolt journaled in a hole of the frame, means for axially adjusting the bolt to determine the thickness of the slices to be cut, a stud at the lower end of the oscillating lever engaging the arm below the bolt and means for returning the gage to its working position during the upward movement of the cutting mechanism, substantially as described and shown.

In witness whereof I have hereunto signed my name this 27th day of October 1923, in the presence of two subscribing witnesses.

PAUL HAASE.

Witnesses:
C. KASPARCH,
EMIL KIPP.